UNITED STATES PATENT OFFICE.

CARL MENSCHING, OF BIRKENHEAD, ENGLAND, ASSIGNOR TO WILLIAM EDWARD MOUNSEY, OF LIVERPOOL, ENGLAND.

MONOAZO DYES.

1,217,042.      Specification of Letters Patent.      Patented Feb. 20, 1917.

No Drawing.      Application filed January 29, 1916. Serial No. 75,072.

*To all whom it may concern:*

Be it known that I, CARL MENSCHING, Ph. D., a subject of the Emperor of Germany, residing at Bromborough Port, New Ferry, Birkenhead, in the county of Chester, England, have invented new and useful Improvements in Monoazo Dyes, of which the following is a specification.

The so-called metachrome mordant and metachrome process of dyeing are described in the specification of British Letters Patent 8,874, A. D. 1900. Since then there have been put upon the market coloring matters with which it is possible to dye, by the said process, a variety of shades fast against milling and light, but among these there has not been a good green, or olive-green, coloring matter although such colors are in great demand both for use alone and for mixing with other colors.

My invention consists in the manufacture and production of metachrome dyeing coloring matters which give green, or olive green, shades, these coloring matters being azo dyes and being made from diazotized picramic acid and unsulfonated amino derivatives of naphthalene such that the azo dyes obtained contain the azo group and an amino group, in the ortho position to one another.

If diazotized picramic acid be combined with alpha-naphthylamin a coloring matter is obtained which can be dyed in the laboratory on metachrome mordant giving a beautiful violet shade, but this coloring-matter is technically useless because, besides having other defects, it is not sufficiently soluble for practical purposes and this is probably why, hitherto, no further investigation has been made with other amino derivatives of naphthalene.

In carrying out my invention diazotized picramic acid can be combined with either beta-naphthylamin, or acetpara-naphthylene-diamin. The coloring matters obtained are sufficiently soluble for technical use and, when dyed on metachrome mordant, at first impart a violet color to the wool, or other material, dyed, but, when the coloring matter is fully developed by prolonged boiling, fine olive green shades are obtained which are fast against milling and light.

The following is an example of how the invention can be performed but the invention is not confined to this example. The parts are by weight.

Diazotize a quantity of picramic acid corresponding to seven parts of sodium nitrite in 400 parts of water which may be done in the usual way and run this diazo solution into a solution of 15 parts of beta-naphthylamin in 300 parts of water and sufficient hydrochloric acid to form the hydrochloric salt. Then add sodium acetate solution, to bind the mineral acid, and stir until the formation of coloring matter is complete, or sufficiently so. Add sodium carbonate to the mass until it is alkaline and then collect the coloring matter and bring it to the standard strength of paste.

The following formula illustrates the invention:—

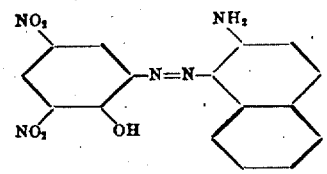

In the following claims, I use the expression "an unsulfonated amino derivative of naphthalene" in a sense broad enough to cover both beta-naphthylamin and acet-para-naphthylene-diamin.

What I claim is:—

1. The manufacture of coloring matters, being azo dyes containing the azo group and an amino group in the ortho position to one another, by combining diazotized picramic acid and an unsulfonated amino derivative of naphthalene.

2. The manufacture of coloring matters by combining diazotized picramic acid and beta-naphthylamin.

3. The manufacture of coloring matters by running a solution of diazotized picramic acid into a solution of beta-naphthylamin and hydrochloric acid, then adding sodium acetate solution and stirring and then adding sodium carbonate and collecting the coloring matter.

4. As new articles of manufacture, coloring matters, being azo dyes containing the azo group and an amino group in the ortho position to one another, produced from diazotized picramic acid and an unsulfonated amino derivative of naphthalene.

5. As new articles of manufacture, coloring matters produced by combining diazotized picramic acid and beta-naphthylamin.

6. As new articles of manufacture, coloring matters produced by running a solution of diazotized picramic acid into a solution of beta-naphthylamin and hydrochloric acid, then adding sodium acetate solution and stirring and then adding sodium carbonate and collecting the coloring matter.

In testimony whereof I have signed my name to this specification in the presence of two subscribing witnesses.

CARL MENSCHING.

Witnesses:
ERNEST FRANCIS EHRHARDT,
RICHARD BEWLEY PENROSE.